US012334100B2

(12) United States Patent
Wilson et al.

(10) Patent No.: US 12,334,100 B2
(45) Date of Patent: Jun. 17, 2025

(54) HEARING SYSTEM INCLUDING A HEARING INSTRUMENT AND METHOD FOR OPERATING THE HEARING INSTRUMENT

(71) Applicant: Sivantos Pte. Ltd., Singapore (SG)

(72) Inventors: Cecil Wilson, Erlangen (DE); Maja Serman, Erlangen (DE); Eghart Fischer, Schwabach (DE)

(73) Assignee: Sivantos Pte. Ltd., Singapore (SG)

( * ) Notice: Subject to any disclaimer, the term of this patent is extended or adjusted under 35 U.S.C. 154(b) by 164 days.

(21) Appl. No.: 17/865,611

(22) Filed: Jul. 15, 2022

(65) Prior Publication Data

US 2023/0047868 A1 Feb. 16, 2023

(30) Foreign Application Priority Data

Aug. 16, 2021 (EP) .................................... 21191541

(51) Int. Cl.
*H04R 25/00* (2006.01)
*G10L 17/06* (2013.01)
*G10L 21/034* (2013.01)
*G10L 21/0364* (2013.01)

(52) U.S. Cl.
CPC .......... *G10L 21/0364* (2013.01); *G10L 17/06* (2013.01); *G10L 21/034* (2013.01); *H04R 25/505* (2013.01); *H04R 25/604* (2013.01); *H04R 25/609* (2019.05); *G10L 2021/03646* (2013.01); *H04R 2225/43* (2013.01)

(58) Field of Classification Search
CPC ............. G10L 17/00; G10L 2021/0135; G10L 2021/03646; G10L 21/003; G10L 21/034; G10L 21/0364; G10L 25/78

USPC ......................................................... 381/321
See application file for complete search history.

(56) References Cited

U.S. PATENT DOCUMENTS

| 6,178,400 | B1 | 1/2001 | Eslambolchi |
| 6,768,801 | B1 | 7/2004 | Wagner et al. |
| 11,510,018 | B2 * | 11/2022 | Serman .................. G10L 25/51 |

(Continued)

FOREIGN PATENT DOCUMENTS

| EP | 1101390 B1 | 4/2004 |
| EP | 3823306 A1 | 5/2021 |
| WO | 2020261148 A1 | 12/2020 |

OTHER PUBLICATIONS

"Service for Session-Level Voice Normalization ED—Darl Kuhn", IP.com, IP.com Inc., West Henrietta, NY, US, Nov. 10, 2011 (Nov. 10, 2011), XP013147974, ISSN: 1533-0001, * the whole document *.

*Primary Examiner* — Phylesha Dabney
(74) *Attorney, Agent, or Firm* — Laurence A. Greenberg; Werner H. Stemer; Ralph E. Locher

(57) ABSTRACT

A hearing system includes a hearing instrument for capturing a sound signal from an environment of the hearing instrument. The captured sound signal is processed, and the processed sound signal is output to a user of the hearing instrument. In a speech recognition step, the captured sound signal is analyzed to recognize speech intervals, in which the captured sound signal contains speech. In a speech enhancement procedure performed during recognized speech intervals, the amplitude of the processed sound signal is periodically varied according to a temporal pattern that is consistent with a stress rhythmic pattern of the user. A method for operating the hearing instrument is also provided.

20 Claims, 6 Drawing Sheets

(56) References Cited

U.S. PATENT DOCUMENTS

2018/0277132 A1 9/2018 LeVoit
2021/0152949 A1 5/2021 Serman et al.

* cited by examiner

HEARING SYSTEM INCLUDING A HEARING INSTRUMENT AND METHOD FOR OPERATING THE HEARING INSTRUMENT

CROSS-REFERENCE TO RELATED APPLICATION

This application claims the priority, under 35 U.S.C. § 119, of European Patent Application EP 21 191 541.8, filed Aug. 16, 2021; the prior application is herewith incorporated by reference in its entirety.

FIELD AND BACKGROUND OF THE INVENTION

The invention relates to a method for operating a hearing instrument. The invention further relates to a hearing system including a hearing instrument.

Generally, a hearing instrument is an electronic device being configured to support the hearing of person wearing it (which person is called the user or wearer of the hearing instrument). In particular, the invention relates to a hearing aid, i.e., a hearing instrument that is specifically configured to at least partially compensate a hearing impairment of a hearing-impaired user. Other types of hearing instruments are configured to support the hearing of normal hearing users, i.e., to improve speech perception in complex acoustic situations.

Hearing instruments are most often configured to be worn in or at the ear of the user, e.g., as a Behind-The-Ear (BTE) or In-The-Ear (ITE) instrument. With respect to its internal structure, a hearing instrument normally includes an (acousto-electric) input transducer, a signal processor and an output transducer. During operation of the hearing instrument, the input transducer captures a sound signal from an environment of the hearing instrument and converts it into an input audio signal (i.e., an electric signal transporting a sound information). In the signal processor, the captured sound signal (i.e., input audio signal) is processed, in particular amplified dependent on sound frequency, to support the hearing of the user, in particular to compensate a hearing-impairment of the user. The signal processor outputs a processed audio signal (also called processed sound signal) to the output transducer. Most often, the output transducer is an electro-acoustic transducer (also called "receiver") that converts the processed sound signal into a processed airborne sound, which is emitted into the ear canal of the user. Alternatively, the output transducer may be an electro-mechanical transducer that converts the processed sound signal into a structure-borne sound (vibrations) that is transmitted, e.g., to the cranial bone of the user. Furthermore, besides classical hearing instruments as described before, there are implanted hearing instruments such as cochlear implants, and hearing instruments the output transducers of which output the processed sound signal by directly stimulating the auditory nerve of the user.

The term "hearing system" denotes one device or an assembly of devices and/or other structures providing functions required for the operation of a hearing instrument. A hearing system may be formed of a single stand-alone hearing instrument. As an alternative, a hearing system may include a hearing instrument and at least one further electronic device, which may be, e.g., one of another hearing instrument for the other ear of the user, a remote control and a programming tool for the hearing instrument. Moreover, modern hearing systems often include a hearing instrument and a software application for controlling and/or programming the hearing instrument, which software application is or can be installed on a computer or a mobile communication device such as a mobile phone (smart phone). In the latter case, typically, the computer or the mobile communication device are not a part of the hearing system. In particular, most often, the computer or the mobile communication device will be manufactured and sold independently of the hearing system.

A typical problem of hearing-impaired persons is bad speech perception which is often caused by the pathology of the inner ear resulting in an individual reduction of the dynamic range of the hearing-impaired person. This means that soft sounds become inaudible to the hearing-impaired listener (particularly in noisy environments) whereas loud sounds more or less retain their perceived loudness levels.

Hearing aids commonly compensate hearing loss by amplifying the captured sound signal. Hereby, a reduced dynamic range of the hearing-impaired user is often compensated using compression, i.e., the amplitude of the processed sound signal is increased as a function of the input signal level. However, commonly used implementations of compression in hearing instruments often result in various technical problems and distortions due to the real time constraints of the signal processing. Moreover, in many cases, compression is not sufficient to enhance speech perception to a satisfactory extent.

In order to improve speech perception of a user wearing a hearing instrument, European Patent Application EP 3 823 306 A1, corresponding to U.S. Publication No. 2021/0152949, discloses a method for operating a hearing instrument in which a sound signal captured from an environment of the hearing instrument is analyzed for speech. In speech intervals, i.e., time intervals in which the captured sound signal contains speech, at least one time derivative of an amplitude and/or a pitch of the captured sound signal is determined. The amplitude of the processed sound signal is temporarily increased, if the at least one derivative fulfils a predefined criterion, e.g., exceeds a predefined threshold. The known method allows for detecting and enhancing rhythmic speech stress ("speech accents"), i.e., variations in the amplitude and/or the pitch of the speech sound, thereby significantly improving the speech perception by the hearing instrument user.

A hearing instrument including a different speech enhancing algorithm is known from European Patent Application EP 1 101 390 B1, corresponding to U.S. Pat. No. 6,768,801. In that case, the level of speech segments in an audio stream is increased. Speech segments are recognized by analyzing the envelope of the signal level. In particular, sudden level peaks (bursts) are detected as an indication of speech.

SUMMARY OF THE INVENTION

It is accordingly an object of the invention to provide a method for operating a hearing instrument, which overcomes the hereinafore-mentioned disadvantages of the heretofore-known methods of this general type and which provides further improved speech perception to a user wearing the hearing instrument.

Another object of the present invention is to provide a hearing system including a hearing instrument, in which the system provides further improved speech perception to a user wearing the hearing instrument.

With the foregoing and other objects in view there is provided, in accordance with the invention, a method for operating a hearing instrument configured to support the hearing of a user (in particular a hearing-impaired user). The method comprises capturing a sound signal from an environment of the hearing instrument, e.g., by an input transducer of the hearing instrument. The captured sound signal is processed, e.g., by a signal processor of the hearing instrument (in particular to at least partially compensate the hearing-impairment of the user), thus producing a processed sound signal. The processed sound signal is output to the user, e.g., by an output transducer of the hearing instrument. In preferred embodiments, the captured sound signal and the processed sound signal, before being output to the user, are audio signals, i.e., electric signals transporting a sound information.

The hearing instrument may be of any type as specified above. Preferably, it is configured to be worn in or at the ear of the user, e.g., as a BTE hearing instrument (with internal or external receiver) or as an ITE hearing instrument. Alternatively, the hearing instrument may be configured as an implantable hearing instrument. The processed sound signal may be output as air-borne sound, as structure-borne sound or as a signal directly stimulating the auditory nerve of the user.

In a speech recognition step, during normal operation of the hearing aid, the captured sound signal is analyzed to recognize (detect) speech intervals, in which the captured sound signal contains speech. E.g., the method known from European Patent Application EP 1 101 390 B1, corresponding to U.S. Pat. No. 6,768,801, may be used to detect speech and speech intervals. In an enhancement procedure, during recognized speech intervals, the amplitude of the processed sound signal is periodically varied to enhance or induce speech accents in the processed sound signal. In particular, the amplitude of the processed sound signal is temporarily increased. Herein, the amplitude is periodically varied according to a temporal pattern that is consistent with a stress rhythmic pattern (SRP) of the user. Thus, the speech contained in the captured audio signal is adapted to the SRP of the user. It is noted that, within the scope of the invention, the enhancement procedure may be applied to the captured sound signal at any stage of the signal processing. It may, thus, be applied to the captured sound signal in its initial form or a partly processed form.

The "stress rhythmic pattern" (SRP) of a speaker generally describes an individual accentuation rhythm, i.e., a temporal pattern of the (linguistic) stress involving temporary variations (peaks) of the amplitude and/or the pitch of the speaker's voice that are (consciously or unconsciously) used for structuring and emphasizing speech. Typically, stress used in speech has a rhythmic structure, which means that the SRP of speech continuously repeats in a non-identical but similar fashion, which is individual for the speaker. Subsequently, in analogy to European Patent Application EP 3 823 306 A1, corresponding to U.S. Publication No. 2021/0152949, the smallest discernible unit of the SRP, i.e., a single peak of the amplitude and/or pitch used for structuring and emphasizing speech, is referred to as a "speech accent." Typically, such speech accents have a temporal duration of about 5 to 15 msec (milliseconds) and occur in a temporal distance to each other of more than 400 msec (corresponding to a rate of less than 2.5 Hz).

The invention is based on the experience that speech is more easily understood by a listener if the speaker and the listener have a similar SRP, whereas speech is harder to understand if the SRPs of the speaker and the listener are markedly different. Using this experience, the invention suggests artificially distorting speech sound contained in the captured sound signal in such a way that the speech sound more closely matches the SRP of the listener, i.e., the user of the hearing instrument. It has been found that this can significantly improve speech perception by the user and, thus, outweigh the negative effects caused by the distortion of the original speech sound.

Within the scope of the invention, the SRP of the user may be predefined or determined independently of the operation of the hearing instrument. However, in a preferred embodiment of the invention, the determination of the user's SRP is implemented as a part of the method for operating the hearing instrument. To this end, preferably, the method further comprises an own-voice (OV) analysis procedure, in which the user's SRP is determined from an own-voice reference signal (OV reference signal) containing speech of the user.

It is noted that the "own-voice reference signal" ("OV reference signal") mentioned above is different from the "captured sound signal" that is processed in the enhancement procedure. While the latter is acquired during normal operation of the hearing instrument (in particular during time intervals in which the user is silent), the OV reference signal will be typically collected in a step that precedes the normal operation of the hearing instrument (and, in particular, the enhancement procedure). Preferably, the OV reference signal is collected by the hearing instrument during a setup step, in particular using the input transducer of the hearing instrument. However, within the scope of the invention, the OV reference signal may also be captured and—optionally—analyzed outside the hearing instrument, using a separate part of the hearing system. E.g., the OV reference signal is captured using a software that is installed on a smart phone. In a suited embodiment of the method, that setup step is performed once during an initial fitting process in which the settings of the hearing instrument are initially adapted to the needs and preferences of the individual user. Alternatively, the setup step can be provided in such a way that it can be repeated in regular intervals or on demand of the user or a health care professional. In yet another embodiment of the invention, the OV reference signal is collected in own-voice intervals (OV intervals) in which the user speaks, during the normal operation of the hearing instrument.

In a preferred embodiment of the invention, the enhancement procedure is performed according to the method known from European Patent Application EP 3 823 306 A1, corresponding to U.S. Publication No. 2021/0152949; with respect to that method, the whole content of European Patent Application EP 3 823 306 A1, corresponding to U.S. Publication No. 2021/0152949, is incorporated herein by reference. In this embodiment, in a derivation step that is performed during recognized speech intervals and precedes the enhancement procedure, at least one derivative of an amplitude and/or at least one derivative of a pitch, i.e., a fundamental frequency, of the captured sound signal is determined. In the enhancement procedure, the at least one derivative is compared with the predefined criterion (such as the predefined threshold, cf. European Patent Application EP 3 823 306 A1, corresponding to U.S. Publication No. 2021/0152949, and meeting of that criterion is taken as an indication of a speech accent. I.e., a speech accent is recognized (detected) every time that criterion is fulfilled by the at least one derivative. By temporarily applying a gain and, thus, temporarily increasing the amplitude of the processed sound signal, the thus recognized speech accents are enhanced to be more easily perceived by the user.

However, according to the invention and different from the teaching of European Patent Application EP 3 823 306 A1, corresponding to U.S. Publication No. 2021/0152949, only those recognized speech accents of the captured sound signal that match the SRP of the user are enhanced. In other words, a recognized speech accent is not enhanced (i.e., upon recognizing a speech accent the amplitude of the processed sound signal is not temporarily increased), if that speech accent—with respect to its temporal occurrence in a series of speech accents—does not match the SRP of the user. By selectively enhancing those recognized speech accents that match the SRP of the user (and by not enhancing not-matching speech accents), the rhythm of the speech contained in the captured sound signal is adapted to SRP of the user, thereby improving speech perception by the user.

In a further embodiment of the invention, alternatively or in addition to enhancing matching speech accents only, at least one artificial speech accent is superimposed on the captured sound signal (in its initial or partly processed form), wherein the time of the artificial speech accent is selected in such a way that the artificial speech accent matches, in a series of preceding (artificial or natural) speech accents, the SRP of the user. In this case, an "artificial speech accent" is a temporary increase of the amplitude of the processed audio signal that is superimposed on the captured audio signal independent of whether or not a natural speech accent (i.e., a speech accent in natural speech) was recognized in the captured sound signal at that point of time. In one variation of this embodiment, one or more artificial speech accents are created so to fill a gap in a series of natural speech accents that match the SRP of the user. In another variation of this embodiment, a series of artificial speech accents corresponding to the SRP of the user are superimposed on the captured audio signal independent of natural speech accents. In other words, the captured sound signal is modulated with a periodic accentuation signal corresponding to the SRP of the user. Thus, the original accentuation rhythm of the speech contained in the captured audio signal is overwritten by the SRP of the user. Thereby, again, the speech is adapted to the SRP of the user to improve speech perception by the user.

Preferably, the artificial speech accents are chosen to be similar to natural speech accents. To this end, the amplitude of the processed sound signal is repeatedly increased for a predefined time interval (TE), preferably for a time interval of 5 to 15 msec, in particular 10 msec. In particular, each artificial accent involves an increase of the amplitude of the processed signal for the time interval.

In a suitable embodiment of the method, in the OV analysis procedure, the SRP of the user is determined using the method known from European Patent Application EP 3 823 306 A1, corresponding to U.S. Publication No. 2021/0152949. Thus, speech accents in the OV reference signal and speech accents in the speech of different speakers are recognized using the same procedure, mutatis mutandis, i.e., by determining at least one derivative of an amplitude and/or at least one derivative of a pitch of the OV reference signal and comparing the at least one derivative with the predefined criterion.

However, in an equally preferred embodiment of the invention, the SRP of the user is determined using a different procedure. Herein, in the OV analysis procedure, a modulation depth of a (sound) amplitude modulation is determined, which is referred to as the "amplitude modulation depth" or "AMD" of the OV reference signal. Speech accents in the OV reference signal are determined by analyzing this AMD, which is determined in at least one predefined modulation frequency range. Speech accents in the OV reference signal are recognized (detected), if the AMD fulfils a predefined criterion, in particular exceeds a predefined threshold.

In both embodiments of the OV analysis procedure times of recognized speech accents in the OV reference signal and/or time intervals between recognized speech accents in the OV reference signal are determined. From these determined times and/or time intervals, the SRP of the user is derived.

In the foregoing, the term "(sound) amplitude modulation" denotes the variation of the sound amplitude of the OV reference signal over time. The amplitude modulation depth (AMD) describes a normalized amplitude of the sound amplitude modulation:

$$AMD = \frac{A_{max} - A_{min}}{A_{max} + A_{min}} \qquad \text{eq. 1}$$

wherein $A_{max}$ and $A_{min}$ are the maximum sound amplitude and the minimum sound amplitude, respectively, of the OV reference signal in a given time window. If a plurality of modulation frequency ranges is analyzed, then the AMD (i.e. one value of the AMD) is calculated for each of the plurality of modulation frequency ranges, and each one of the plural AMD values is tested for fulfilling the pre-defined criterion, in particular for exceeding a respective threshold.

Since the amplitude modulation is a time-dependent quantity, it can be described as a distribution of (modulation) frequencies. It is noted that these modulation frequencies are different from the sound frequencies that form the OV reference signal. Preferably, that time window used for calculating $A_{max}$ and $A_{min}$ is adapted to the modulation frequency range for which the AMD is determined. For instance, the time window may be selected so to closely correspond to the lower edge of the modulation frequency range. If, for example, the lower edge of the modulation frequency range is 0.9 Hz (corresponding to a cycle time 1.1 sec), then the attributed time window may be set to a value between 1.1 sec and 1.5 sec. In general, the time window is selected in such a way that it covers a few (e.g. 1 to 5) oscillations of the sound amplitude in the respective frequency range.

In a preferred implementation of the before-mentioned embodiment, the AMD of the OV reference signal is determined and analyzed separately for three modulation frequency ranges, i.e.:
- a first modulation frequency range of 12-40 Hz that corresponds to the typical rate of phonemes in speech,
- a second modulation frequency range of 2.5-12 Hz that corresponds to the typical rate of syllables in speech, and
- a third modulation frequency range of 0.9-2.5 Hz that corresponds to the typical rate of speech accents (i.e., stress) in speech.

Preferably, for each of these modulation frequency ranges, the respective AMD is compared with a respective threshold. Hereby, a speech accent is recognized (detected), if the respective threshold (which may have the same value or different values for the three modulation frequency ranges) is exceeded, at a same time, for all three modulation frequency ranges. In other words, an event in which the respective threshold is exceeded in one or two of the three modulation frequency ranges only, is not considered a speech accent. This allows for recognizing speech accents in the OV reference signal with a very high sensitivity and selectivity.

In a simple yet effective embodiment of the invention a time average (cycle time) of the time intervals between recognized speech accents of the OV reference signal is derived as a representation of the SRP of the user. This represents the simplest case in which the SRP be formed of one speech accent and a time interval to the following speech accent in such a way that, in a speech stream of the user, the speech accents approximately occur in equidistant time intervals (which, for most cases, is a fairly good approximation of real speech).

In more refined and more precise embodiments, a more complex SRP including times or time intervals related to a plurality speech accents, is derived from the OV reference signal in order to more precisely characterize the user's speech. Within the scope of the invention, statistical algorithms or methods of pattern recognition may be used for deriving the SRP of the user. For example, artificial intelligence such as an artificial neural network may be used.

In a further embodiment of the method, only a limited frequency range of the sound frequencies forming the OV reference signal is used for determining the speech accents in the OV reference signal. Preferably, this limited frequency range contains low sound frequencies of the OV reference signal, e.g., 60 Hz to 5 kHz that dominate in speech. Thus, in the before-mentioned embodiment, the method includes extracting a low sound frequency range from the OV reference signal and determining the SRP of the user from the low sound frequency range of the OV reference signal only. Thus, a possible disturbance of the speech accent recognition by high frequency noise contained in the OV reference signal can be avoided. Preferably, the low sound frequency range is extracted by splitting the OV reference signal into a plurality of sound frequency bands and selectively using a number of low sound frequency bands for the recognition of the speech accents in the OV reference signal.

In a further embodiment of the method, a degree of difference of the user's SRP with respect to stress contained in the captured sound signal during speech intervals is determined. Herein, the enhancement procedure is only performed if the degree of difference exceeds a predefined threshold. In other words, the SRP of the user is compared with the stress of speech contained in the captured sound signal. Herein, speech accents in the captured sound signal are only enhanced or induced if the user's SRP is markedly different from the stress of the speech contained in the captured sound signal. Otherwise, if the stress of the speech contained in the captured sound signal is found to be very similar or even identical to the SRP of the user, then the stress contained in the captured sound signal is left untouched; i.e., speech accents are not enhanced or induced. This embodiment is based on the experience that the adaptation of the captured sound signal to the SRP of the user according to the invention is neither necessary nor efficient, if the stress contained in the captured sound signal is very similar or even identical to the SRP of the user. Thus, in the latter case, this adaptation is omitted in order not to degrade the sound quality. The degree of difference may be derived by determining an SRP of a different speaker (i.e., a speaker different from the user) from the captured sound signal, preferably by using the same method that was used for determining the user's SRP from the OV reference signal, if applicable, and correlating the different speaker's SRP with the user's SRP; if the SRP is represented by a single cycle time, then the degree of difference may be determined by calculation the difference of the cycle times of the user's SRP and a different speaker's SRP. If the captured sound signal contains speech of a plurality of different speakers, then a separate SRP may be derived for each of the different speakers. Within the scope of the invention, the degree of difference may be defined inversely, thus having high values for similar or identical SRPs and low values for different SRPs. In this case, the enhancement procedure is only performed if the degree of difference falls below the predefined threshold.

In a simple yet suited embodiment of the invention, the enhancement procedure is applied to all speech intervals, independent of whether the captured sound signal contains speech of the user or speech of a different speaker. However, by preference, recognized speech intervals are distinguished into own-voice intervals, in which the user speaks, and foreign-voice intervals, in which at least one different speaker speaks. In this case, preferably, the speech enhancement procedure is only performed during foreign-voice intervals. In other words, speech accents are not enhanced or induced during own-voice intervals. This embodiment reflects the experience that the enhancement of speech accents is not needed when the user speaks as the user—knowing what he or she has the—has no problem to perceive his or her own voice. By stopping the enhancement of speech accents during own-voice intervals, a processed sound signal containing a more natural sound of the own voice is provided to the user.

With the objects of the invention in view, there is also provided a hearing system with a hearing instrument (as previously specified). The hearing instrument comprises an input transducer disposed to capture an (original) sound signal from an environment of the hearing instrument, a signal processor disposed to process the captured sound signal to support the hearing of the user (thus providing a processed sound signal), and an output transducer disposed to emit the processed sound signal to the user.

Generally, the hearing system is configured to automatically perform the method according to the first aspect of the invention. To this end, the system comprises:

a voice recognition unit configured to analyze the captured sound signal to recognize speech intervals; and a speech enhancement unit configured to periodically vary, during recognized speech intervals, the amplitude of the processed sound signal according to a temporal pattern that is consistent with the SRP of the user.

For each embodiment or variation of the method according to the first aspect of the invention there is a corresponding embodiment or variation of the hearing system according to the second aspect of the invention. Thus, disclosure related to the method also applies, mutatis mutandis, to the hearing system, and vice-versa.

In particular, in a preferred embodiment, the hearing system further includes a derivation unit configured to determine, during recognized speech intervals, at least one time derivative of an amplitude and/or a pitch of the captured sound signal. Herein the speech enhancement unit is configured to temporarily increase the amplitude of the processed sound signal, if the at least one derivative fulfils a predefined criterion, in particular exceeds a predefined threshold, and if the time at which the predefined criterion is fulfilled, is compatible with the SRP of the user.

Additionally or alternatively, the speech enhancement unit is configured to superimpose an artificial speech accent on the captured audio signal by temporarily increasing the amplitude of the processed audio signal in such a way that the artificial speech accent matches, in a series of preceding (artificial or natural) speech accents, the SRP of the user.

In a further embodiment of the invention, the speech enhancement unit is configured to repeatedly increase the amplitude of the processed sound signal for a predefined time interval, preferably for a time interval of 5 to 15 msec, in particular 10 msec.

In a further embodiment of the invention, the speech enhancement unit is configured to determine a degree of difference of the SRP of the user with respect to stress contained in the captured sound signal during speech intervals; and to perform the enhancement procedure only, if the degree of difference exceeds a predefined threshold.

In further preferred embodiments, the hearing system includes a voice analysis unit configured to determine the user's SRP from an OV reference signal containing speech of the user. Preferably, the voice analysis unit is configured:
- to determine speech accents from the OV reference signal by analyzing a modulation depth of an amplitude modulation of the OV reference signal in at least one predefined modulation frequency range;
- to determine times of recognized speech accents of the OV reference signal and/or time intervals between recognized speech accents of the OV reference signal; and
- to derive the SRP from the determined times and/or time intervals.

Preferably, the voice analysis unit is further configured:
- to determine the modulation depth of the amplitude modulation of the OV reference signal for a first modulation frequency range of 12-40 Hz, a second modulation frequency range of 2.5-12 Hz and a third modulation frequency range of 0.9-2.5 Hz; and
- to recognize a speech accent if the determined modulation depth exceeds a predefined threshold for each one of the three modulation frequency ranges simultaneously.

In a further embodiment of the invention, the voice analysis unit is configured to derive a time average of the time intervals between speech accents as a representation of the SRP.

In a further embodiment of the invention, the hearing system is configured to extract a low sound frequency range of the OV reference signal. In this case, preferably, the voice analysis unit is configured to determine speech accents from the low sound frequency range of the OV reference signal only.

Preferably, the signal processor is configured as a digital electronic device. It may be a single unit or be formed of a plurality of sub-processors. The signal processor or at least one of the sub-processors may be a programmable device (e.g., a microcontroller). In this case, the functionality mentioned above or part of the functionality may be implemented as software (in particular firmware). Also, the signal processor or at least one of the sub-processors may be a non-programmable device (e.g., an ASIC). In this case, the functionality mentioned above or part of the functionality may be implemented as hardware circuitry.

In a preferred embodiment of the invention, the voice recognition unit, the voice analysis unit, the speech enhancement unit and/or, if applicable, the derivation unit are disposed in the hearing instrument. In particular, each of these units may be configured as a hardware or software component of the signal processor or as separate electronic component. However, in other embodiments of the invention, at least one of the before-mentioned units, in particular the voice recognition unit, the voice analysis unit and/or the speech enhancement unit or at least a functional part thereof may be implemented in an external electronic device such as a mobile phone.

In a preferred embodiment, the voice recognition unit includes a voice activity detection (VAD) module for general voice activity (i.e., speech) detection and an OV detection (OVD) module for detection of the user's own voice.

Other features which are considered as characteristic for the invention are set forth in the appended claims.

Although the invention is illustrated and described herein as embodied in a hearing system including a hearing instrument and a method for operating the hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
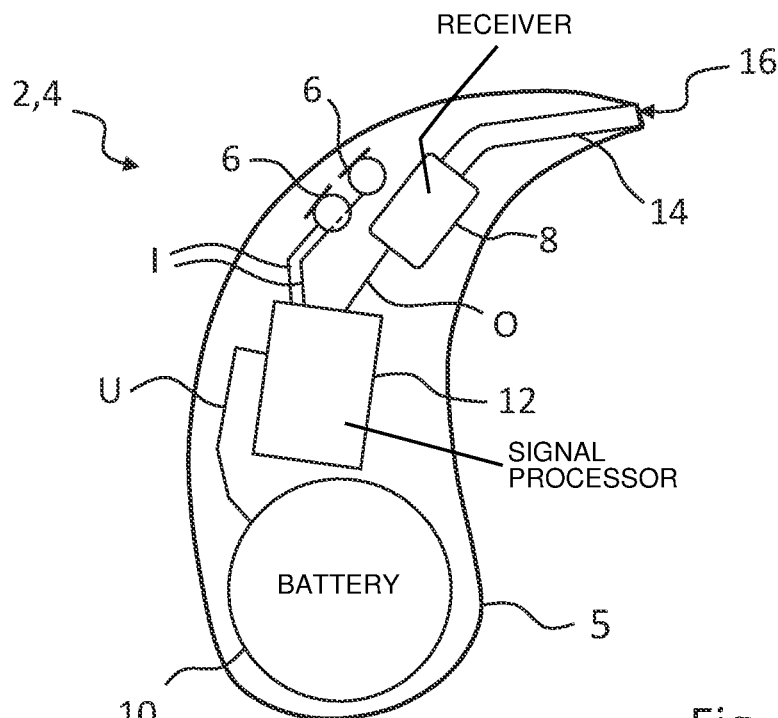
FIG. 1 is a diagrammatic, longitudinal-sectional view of a hearing system including a hearing aid, the hearing aid including an input transducer disposed to capture a sound signal from an environment of the hearing aid, a signal processor disposed to process the captured sound signal, and an output transducer disposed to emit the processed sound signal to a user.

Referring now in detail to the figures of the drawings, in which like reference numerals indicate like parts, structures and elements unless otherwise indicated, and first, particularly, to FIG. 1 thereof, there is seen a hearing system 2 including a hearing aid 4, i.e., a hearing instrument configured to support the hearing of a hearing-impaired user, that is configured to be worn in or at one of the ears of the user. As shown in FIG. 1, by way of example, the hearing aid 4 may be configured as a Behind-The-Ear (BTE) hearing aid. Optionally, the system 2 includes a second hearing aid (not shown) to be worn in or at the other ear of the user to provide binaural support to the user.

The hearing aid 4 includes, inside a housing 5, two microphones 6 as input transducers and a receiver 8 as an output transducer. The hearing aid 4 further includes a battery 10 and a signal processor 12. Preferably, the signal processor 12 includes both a programmable sub-unit (such as a microprocessor) and a non-programmable sub-unit (such as an ASIC).

The signal processor 12 is powered by the battery 10, i.e., the battery 10 provides an electric supply voltage U to the signal processor 12.

During normal operation of the hearing aid 4, the microphones 6 capture an air-borne sound signal from an environment of the hearing aid 2. The microphones 6 convert the air-borne sound into an input audio signal I (also referred to as the "captured sound signal"), i.e., an electric signal containing information on the captured sound. The input audio signal I is fed to the signal processor 12. The signal processor 12 processes the input audio signal I, i.a., to provide a directed sound information (beam-forming), to perform noise reduction and dynamic compression, and to individually amplify different spectral portions of the input audio signal I based on audiogram data of the user to compensate for the user-specific hearing loss. The signal processor 12 emits an output audio signal O (also referred to as the "processed sound signal"), i.e., an electric signal containing information on the processed sound to the receiver 8. The receiver 8 converts the output audio signal O into processed air-borne sound that is emitted into the ear canal of the user, through a sound channel 14 connecting the receiver 8 to a tip 16 of the housing 5 and a flexible sound tube (not shown) connecting the tip 16 to an earpiece inserted in the ear canal of the user.

Figure 2:
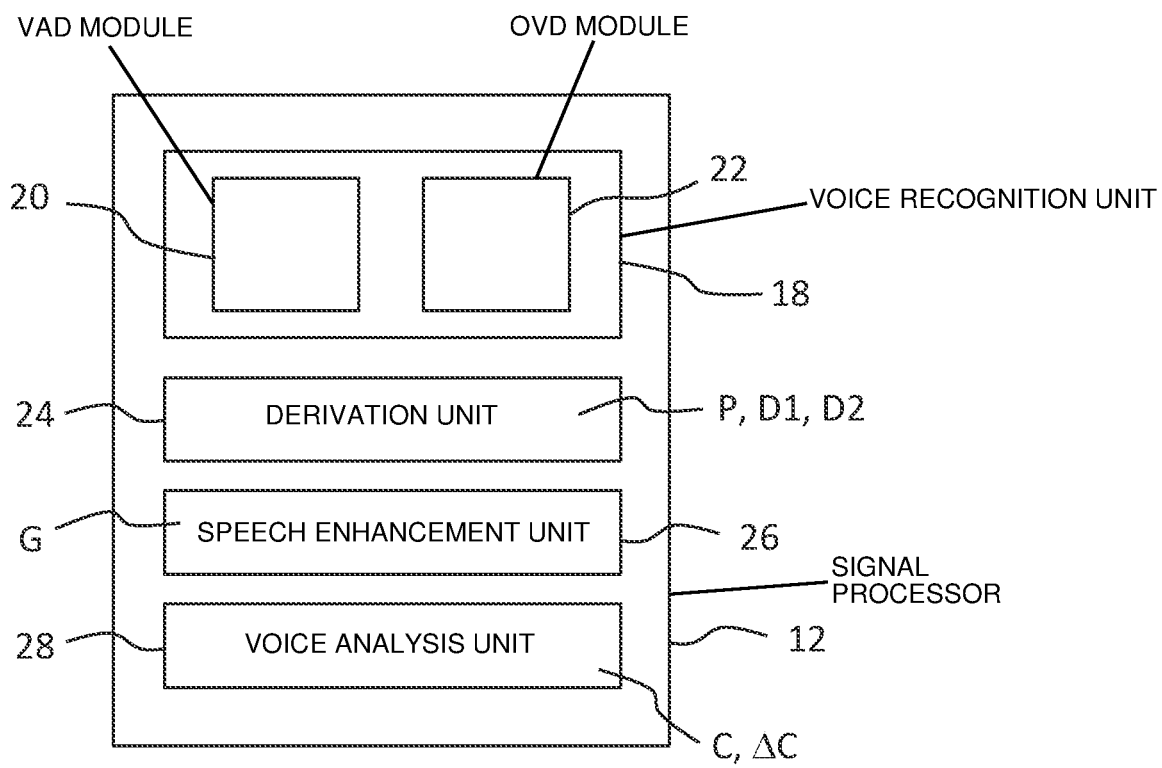
FIG. 2 is a block diagram showing the functional structure of the signal processor of the hearing aid shown in FIG. 1.

As illustrated in FIG. 2, the signal processor 12 includes a voice recognition unit 18, that includes a voice activity detection (VAD) module 20 and an own-voice detection module (OVD module) 22. By preference, both modules 20 and 22 are configured as software components installed in the signal processor 12.

The VAD module 20 generally detects the presence of voice (i.e., speech, independent of a specific speaker) in the input audio signal I, whereas the OVD module 22 specifically detects the presence of the user's own voice in the input audio signal I. By preference, modules 20 and 22 apply technologies of VAD and OVD, that are as such known in the art, e.g., from U.S. Publication 2013/0148829 A1 or International Publication WO 2016/078786 A1. By analyzing the input audio signal I (and, thus, the captured sound signal), the VAD module 20 and the OVD module 22 recognize speech intervals, in which the input audio signal I contains speech, which speech intervals are distinguished (subdivided) into own-voice intervals (OV intervals), in which the user speaks, and foreign-voice intervals (FV intervals), in which at least one different speaker speaks while the user is silent.

Furthermore, the hearing system 2 includes a derivation unit 24, a speech enhancement unit 26 and a voice analysis unit 28.

The derivation unit 24 is configured to derive a pitch P (i.e., the fundamental frequency) from the input audio signal I as a time-dependent variable. The derivation unit 24 is further configured to apply a moving average to the measured values of the pitch P, e.g., applying a time constant (i.e., size of the time window used for averaging) of 15 msec, and to derive the first (time) derivative D1 and the second (time) derivative D2 of the time-averaged values of the pitch P.

For example, in a simple yet effective implementation, a periodic time series of time-averaged values of the pitch P is given by ..., AP[n−2], AP[n−1], AP[n], ..., where AP[n] is a current value, and AP[n−2] and AP[n−1] are previously determined values. Then, a current value D1[n] and a previous value D1[n−1] of the first derivative D1 may be determined as $$D1[n]=AP[n]-AP[n-1]=D1,$$

$$D1[n-1]=AP[n-1]-AP[n-2],$$

and a current value D2[n] of the second derivative D2 may be determined as $$D2[n]=D1[n]-D1[n'1]=D2.$$

The speech enhancement unit 26 is configured to analyze the derivatives D1 and D2 with respect to a criterion subsequently described in more detail in order to recognize speech accents in the input audio signal I (and, thus, the captured sound signal). Furthermore, the speech enhancement unit 26 is configured to temporarily apply an additional gain G to the input audio signal I (in its initial or a partly processed form) and, thus, increase the amplitude of the processed sound signal O, if the derivatives D1 and D2 fulfil the criterion (being indicative of a speech accent).

By preference, the derivation unit 24, the speech enhancement unit 26 and the voice analysis unit 28 are configured as software components being installed in the signal processor 12.

Figure 3:
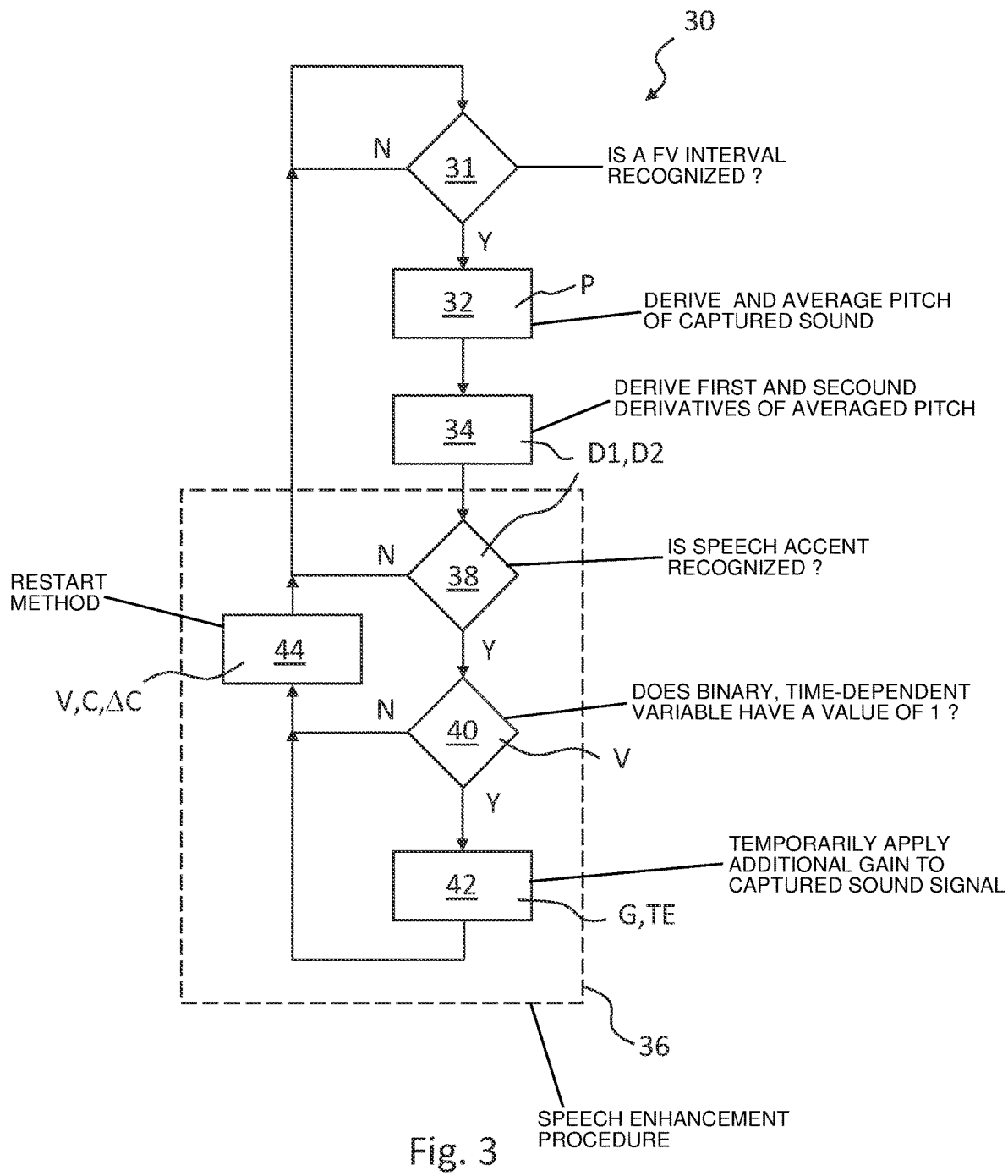
FIG. 3 is a flow chart of a method for operating the hearing aid of FIG. 1, the method including, in a speech enhancement procedure, temporarily applying a gain to the captured sound signal and, thus, temporarily increasing the amplitude of the processed sound signal to enhance or induce speech accents in speech contained in the captured sound signal, wherein the speech accents are enhanced or induced with a temporal pattern that is consistent with a predefined stress rhythmic pattern (SRP) of the user.

During normal operation of the hearing aid 4, the voice recognition unit 18, i.e., the VAD module 20 and the OVD module 22, the derivation unit 24 and the speech enhancement unit 26 interact to execute a method 30 illustrated in FIG. 3.

In a (speech recognition) step 31 of the method, the voice recognition unit 18 analyzes the input audio signal I for FV intervals, i.e., it checks whether the VAD module 20 returns a positive result (which is indicative of the detection of speech in the input audio signal I), while the OVD module 22 returns a negative result (indicative of the absence of the user's own voice in the input audio signal I).

If a FV interval is recognized (Y), then the voice recognition unit 18 triggers the derivation unit 24 to execute a next step 32. Otherwise (N), step 31 is repeated.

In step 32, the derivation unit 24 derives the pitch P of the captured sound from the input audio signal I and applies time averaging to the pitch P as described above. In a subsequent (derivation) step 34, the derivation unit 24 derives the first derivative D1 and the second derivative D2 of the time-averaged values of the pitch P.

Thereafter, the derivation unit 24 triggers the speech enhancement unit 26 to perform a speech enhancement procedure 36 which, in the example shown in FIG. 3, is subdivided into four steps 38, 40, 42 and 44.

In the step 38, the speech enhancement unit 26 analyzes the derivatives D1 and D2 as mentioned above to recognize speech accents. If a speech accent is recognized (Y), then the speech enhancement unit 26 proceeds to step 40. Otherwise (N), i.e., if no speech accent is recognized, the speech enhancement unit 26 triggers the voice recognition unit 18 to execute step 31 again.

By preference, the speech enhancement unit 26 uses one of the algorithms described in European Patent Application EP 3 823 306 A1, corresponding to U.S. Publication No. 2021/0152949, to recognize speech accents of a different speaker's voice in the input audio signal I, wherein the before-mentioned criterion for recognizing speech accents involves a comparison of the first derivative D1 of the time-averaged pitch P with a threshold, which comparison is further influenced by the second derivative D2.

According to a first algorithm, the speech enhancement unit 26 checks whether the first derivative D1 exceeds the threshold. If so (Y), the speech enhancement unit 26 proceeds to step 40. Otherwise (N), the speech enhancement unit 26 triggers the voice recognition unit 18 to execute step 31 again. The threshold is offset (varied) in dependence on the second derivative D2, as described in European Patent Application EP 3 823 306 A1, corresponding to U.S. Publication No. 2021/0152949.

According to a second algorithm, the speech enhancement unit 26 multiplies the first derivative D1 with a variable weight factor which is determined in dependence of the second derivative D2, as described in European Patent Application EP 3 823 306 A1, corresponding to U.S. Publication No. 2021/0152949. Subsequently, the speech enhancement unit 26 checks whether the weighted first derivative D1 exceeds the threshold. If so (Y), the speech enhancement unit 26 proceeds to step 40. Otherwise (N), the speech enhancement unit 26 triggers the voice recognition unit 18 to execute step 31 again.

Step 40 is executed by the speech enhancement unit 26, if step 38 yields a positive result (Y). In this step 40, the speech enhancement unit 26 checks whether the current time (i.e., the point in time at which, in the previous step 38, a speech accent was recognized) matches with a predefined stress rhythmic pattern (SRP) of the user. To this end, e.g., the speech enhancement unit 26 may check whether a binary, time-dependent variable V has a value of 1 (V=1?). If so (Y), indicative of the recognized speech accent matching the individual accentuation rhythm of the user, the speech enhancement unit 26 proceeds to step 42. Otherwise (N), the speech enhancement unit 26, through subsequently described step 44, triggers the voice recognition unit 18 to execute step 31 again.

In step 42, the speech enhancement unit 26 temporarily applies the additional gain G to the captured sound signal. Thus, for a predefined time interval (called enhancement interval TE), the amplitude of the processed sound signal O is increased, thus enhancing the recognized speech accent. After expiration of the enhancement interval TE, the additional gain G is reduced to 1 (0 dB). The speech enhancement unit 26, through step 44, triggers the voice recognition unit 18 to execute step 31 and, thus, to start the method according to FIG. 3 again. As mentioned before, the additional gain G may be applied to the captured sound signal at any stage of the signal processing. It may, thus, be applied to the input audio I as initially captured by the microphones 6, but it may also be applied to the captured sound signal after one or more preceding signal processing steps.

As disclosed in European Patent Application EP 3 823 306 A1, corresponding to U.S. Publication No. 2021/0152949, the additional gain G may be, e.g., increased and decreased step-wise (i.e., as a binary function of time) or increased step-wise and decreased continuously with a linear or non-linear dependence on time, or increased and decreased continuously with a linear or non-linear dependence on time.

Initially, the variable V is pre-set to a constant value of 1 (V=1). Thus, when step 40 is executed for the first time within a FV interval, it will always yield a positive result (Y), and the speech enhancement unit 26 will always proceed to step 42.

Thereafter, in step 44, the speech enhancement unit 26 modifies the variable V to indicate time windows in which future speech accents are expected (according to the SRP of the user). Within each of those time windows, the variable V is assigned a value of 1 (V=1). Outside of those time windows, the variable V is assigned a value of 0 (V=0). In the example shown in FIG. 3, the SRP of the user is represented by an average time interval (subsequently referred to as a cycle time C) between consecutive speech accents of the user's own voice. Thus, the time windows are selected as to match the cycle time C plus-minus a confidence interval $\Delta C$ thereof: A first time window will start at $C-\Delta C$ and end at $C+\Delta C$, from the point in time at which step 42 is executed. Analogously, a second time window will start at $2 \cdot C-\Delta C$ and end at $2 \cdot C+\Delta C$, a third time window will start at $3 \cdot C-\Delta C$ and end at $3 \cdot C+\Delta C$, etc.

The variable V is reset to the constant value of 1 (V=1), if step 31 yields a negative result (N), indicating the end or absence of a FV interval.

Figure 4:
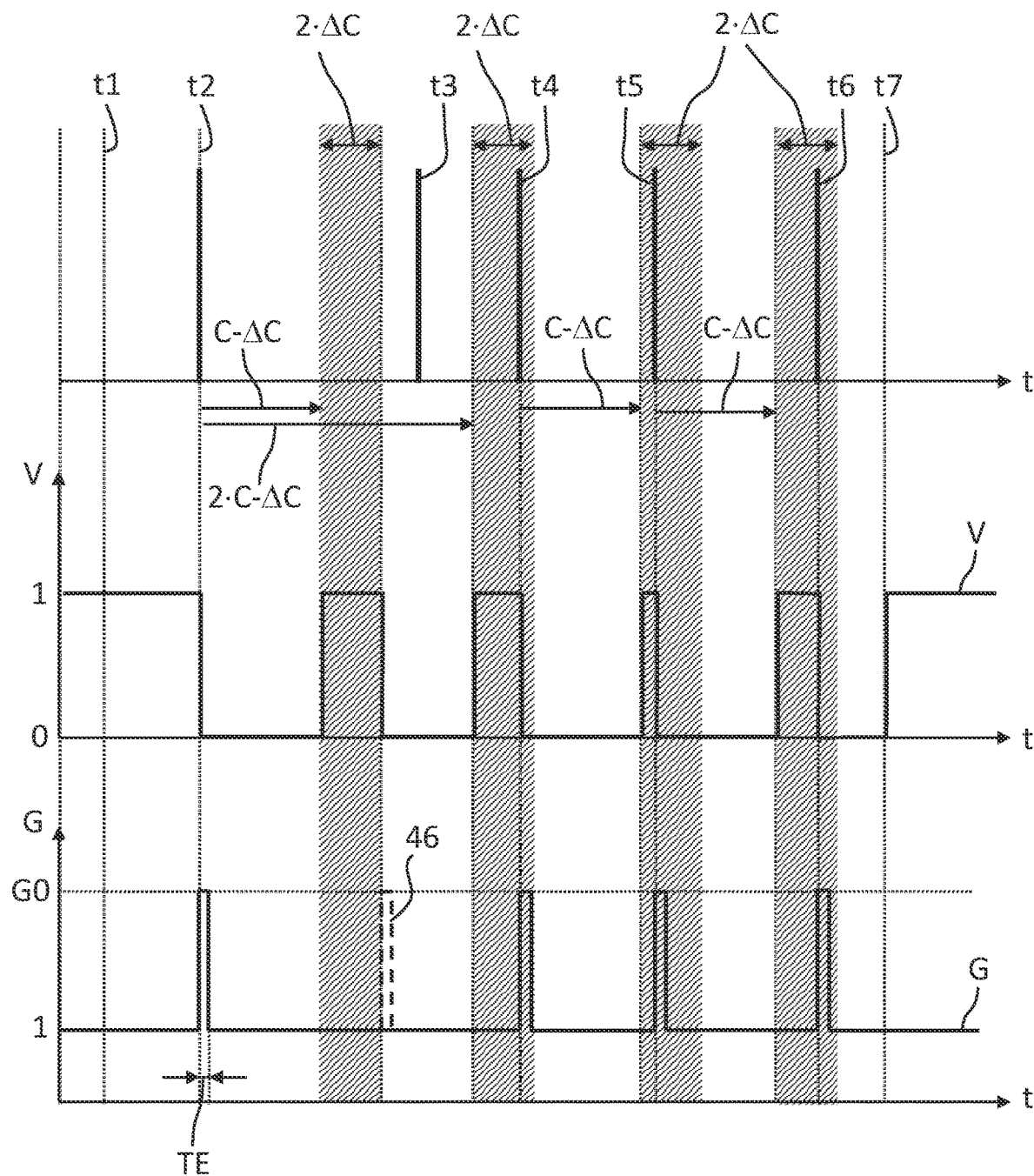
FIG. 4 shows, in three synchronous diagrams over time, a series of speech accents recognized in foreign-voice speech contained in the captured sound signal (upper diagram), a binary time-dependent variable indicating time windows, in which future speech accents matching the SRP of the user are to be expected (middle diagram), and the gain applied to enhance speech accents of the foreign-voice speech that match the SRP of the user (lower diagram)

The influence of the variable V on the method 30 shown in FIG. 3 is illustrated in FIG. 4.

The upper diagram of FIG. 4 shows, by way of example, a series of events over time t characterizing the input audio signal I and, thus, the captured sound signal. At a time t1, a FV interval starts. At times t2, t3, t4, t5 and t6, five consecutive speech accents of a foreign-voice speech are recognized in the input audio signal I. At time t7, the FV interval ends.

In the middle diagram of FIG. 4, the time dependence of the variable V is shown. The lower diagram of FIG. 4 shows the corresponding time dependence of the additional gain G.

It can be seen that, before the first speech accent is recognized at time t2, the variable V is pre-set to a constant value of 1 (V=1). Therefore, at time t2, steps 40 and 42 of the method according to FIG. 4 are executed for the first time.

In step 42, at time t2, the gain G is temporarily increased to enhance the first speech accent.

In step 44, the variable V is modified to indicate a series of time windows (shown as hatched areas) as described above. A first time window starts time $t2+C-\Delta C$, a second time window starts at time $t2+2 \cdot C-\Delta C$. Each of the time windows has a duration of $2 \cdot \Delta C$. As shown, within each of the time windows, the variable has a value of 1 (V=1), whereas outside the time windows, the variable V is set to a constant value of zero (V=0).

It is seen from FIG. 4 that the first time window passes without a further speech accent being recognized. In fact, the time t3 at which the second speech accent is recognized, is between the first time window and the second time window. Since, at time t3, the variable V is set to zero (V=0), step 40 yields negative result (N). Thus, step 42 is not executed, and the second speech accent is not enhanced.

The time t4 at which the third speech accent is recognized, is within the second time window. Thus, step 42 is executed. Subsequently, in step 44, the variable V is reset to zero and modified to indicate adapted time windows (of which a first one starts at time t4+C−ΔC). In step 42, at time t4, the gain G is temporarily increased to enhance the third speech accent.

This process is repeated at times t5 and t6 for the fourth and fifth speech accent.

At time t7, at the end of the foreign-speech interval, step 31 yields a negative result. In consequence, the variable V is reset to a constant value of 1 (V=1).

Optionally, in a refined version of the method 30 shown in FIG. 3, the speech enhancement unit 26 creates an artificial speech accent 46 (FIG. 4) at the end of any time window in which no (natural) speech accent was recognized in the input audio signal I. In the example of FIG. 4, the artificial speech accent 46 may be created at time t2+C+ΔC, at the end of the first time window, to fill the gap between the natural speech accents recognized at times t2 and t4 in a temporal pattern that is consistent with the SRP of the user. As indicated with dashed lines in FIG. 4, the artificial speech accent 46 is created by temporarily increasing the gain G in the same way as is done at times t2, t4, t5 and t6.

Preferably, the variables characterizing the SRP of the user, i.e., the cycle time C and the confidence interval ΔC, are determined by the hearing system 2 in a setup process preceding the normal operation of the hearing aid 4. To this end, the voice recognition unit 18, the derivation unit 24 and the voice analysis unit 28 interact to execute an own-voice analysis procedure (OV analysis procedure) 50 shown in FIG. 5.

In an OV recognition step 51 of the OV analysis procedure 50, the voice recognition unit 18 analyzes the input audio signal I for OV intervals, i.e., it checks whether the OVD module 22 returns a positive result (indicative of the detection of the own voice of the user in the input audio signal I). If so (Y), the voice recognition unit 18 triggers the derivation unit 24 to execute step 52. Otherwise (N), step 51 is repeated.

In step 52 and subsequent steps 54 and 56, which resemble the corresponding steps 32, 34 and 38 of the method of FIG. 3, respectively, the pitch P of the user's own voice is determined (step 52), the first and second derivatives D1 and D2 of the time-averaged pitch P are derived by the derivation unit 24 (derivation step 54), and speech accents in the user's own voice are recognized by the voice analysis unit 28 (step 56). If a speech accent is recognized by the voice analysis unit 28 (Y), the speech enhancement unit 26 proceeds to step 58. Otherwise (N), i.e., if no speech accent is recognized, then the voice analysis unit 28 triggers the voice recognition unit 18 to execute step 51 again.

In step 58, the voice analysis unit 28 determines and statistically evaluates the times at which speech accents are recognized in the own voice of the user and determines the cycle time C and the confidence interval ΔC as a representation of the SRP of the user. The confidence interval ΔC may be determined, e.g., as the standard deviation or as the statistical range of the measured values of the cycle time C of the user's own voice. The cycle time C and the confidence interval ΔC are stored in a memory of the hearing aid 4 for later use during the normal operation of the hearing aid 4.

The procedure 50 is terminated when a sufficiently high number of speech accents (e.g., 1000 speech accents) of the user's own speech have been recognized and evaluated. Thus, the sound signal captured by the hearing instrument 4 during OV intervals is used as an OV reference signal to derive the SRP of the user.

Figure 5:
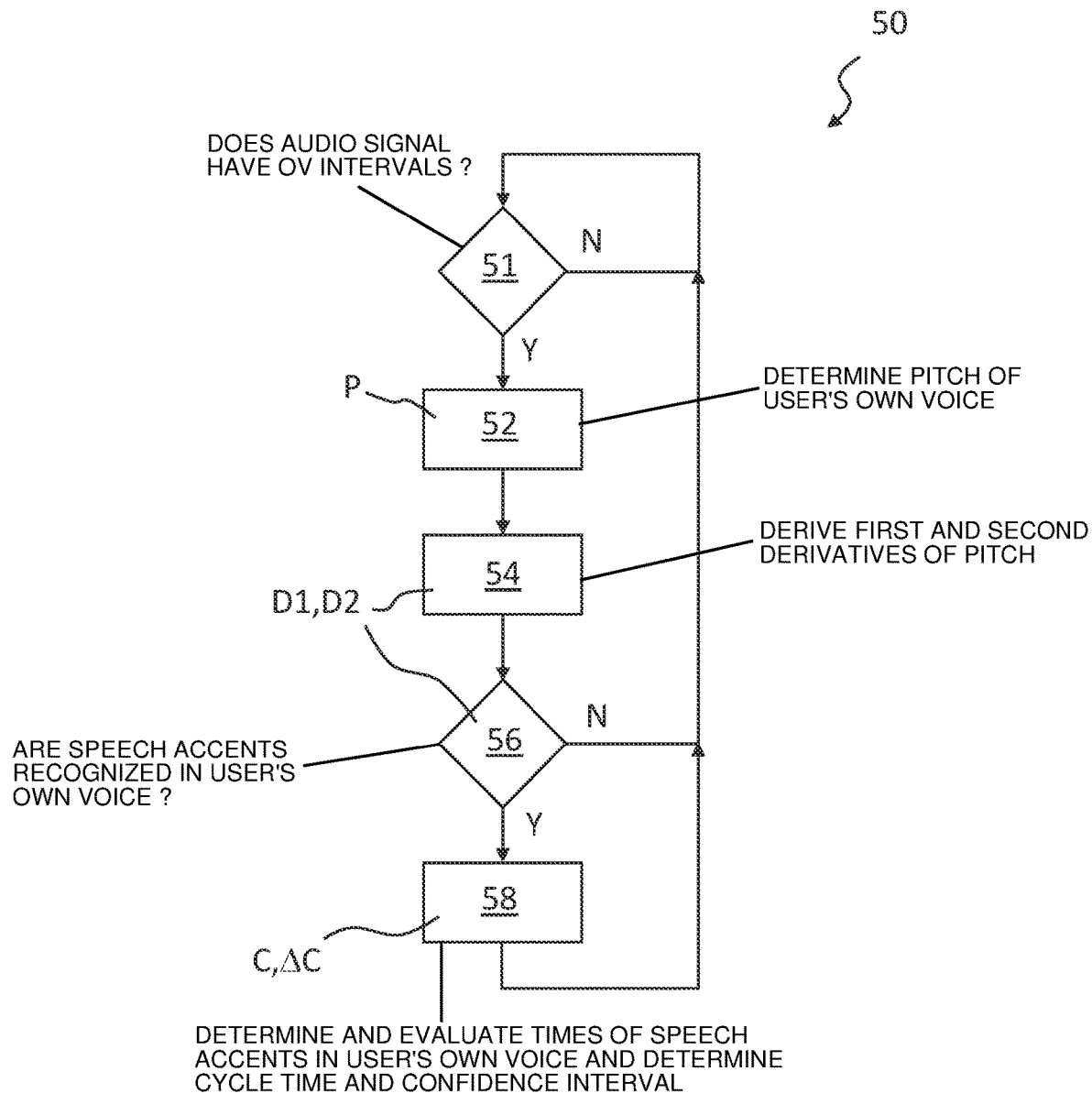
FIG. 5 is a flow chart of an own-voice analysis procedure for determining the SRP of the user.

In a variation of the procedure 50 shown in FIG. 5, the steps 52 to 58 are executed both in OV intervals and FV intervals, in particular during the normal operation of the hearing aid 4. Hereby, in step 58, the voice analysis unit 28 is applied to both foreign voice and the own voice of the user, and derives separate values of the cycle time C for foreign voice and own voice, respectively. The voice analysis unit 28, thus, determines the SRP of the user and the SPR of a foreign speaker. In a corresponding variation of the method 30 shown in FIG. 3, e.g., in step 44 or in step 31, the speech enhancement unit 26 compares the SRP of the user and the SPR of a foreign speaker by comparing the difference of the values of the cycle time C for foreign voice and own voice, respectively, with a threshold. In this case, the speech accents of the foreign voice are only enhanced (step 42), if the SRP of the user and the SPR of a foreign speaker are found to be sufficiently different, i.e., if difference of the values of the cycle time C for foreign voice and own voice, respectively, exceeds the threshold. Otherwise, the variable V is set to 0 which results in step 42 being skipped.

Optionally, the voice contained in the input audio signal I during FV intervals is analyzed to distinguish the voices of a plurality different speakers, if present. In this case, the SRP (i.e., a value of the cycle time C) is separately determined for every individual different speaker.

Figure 6:
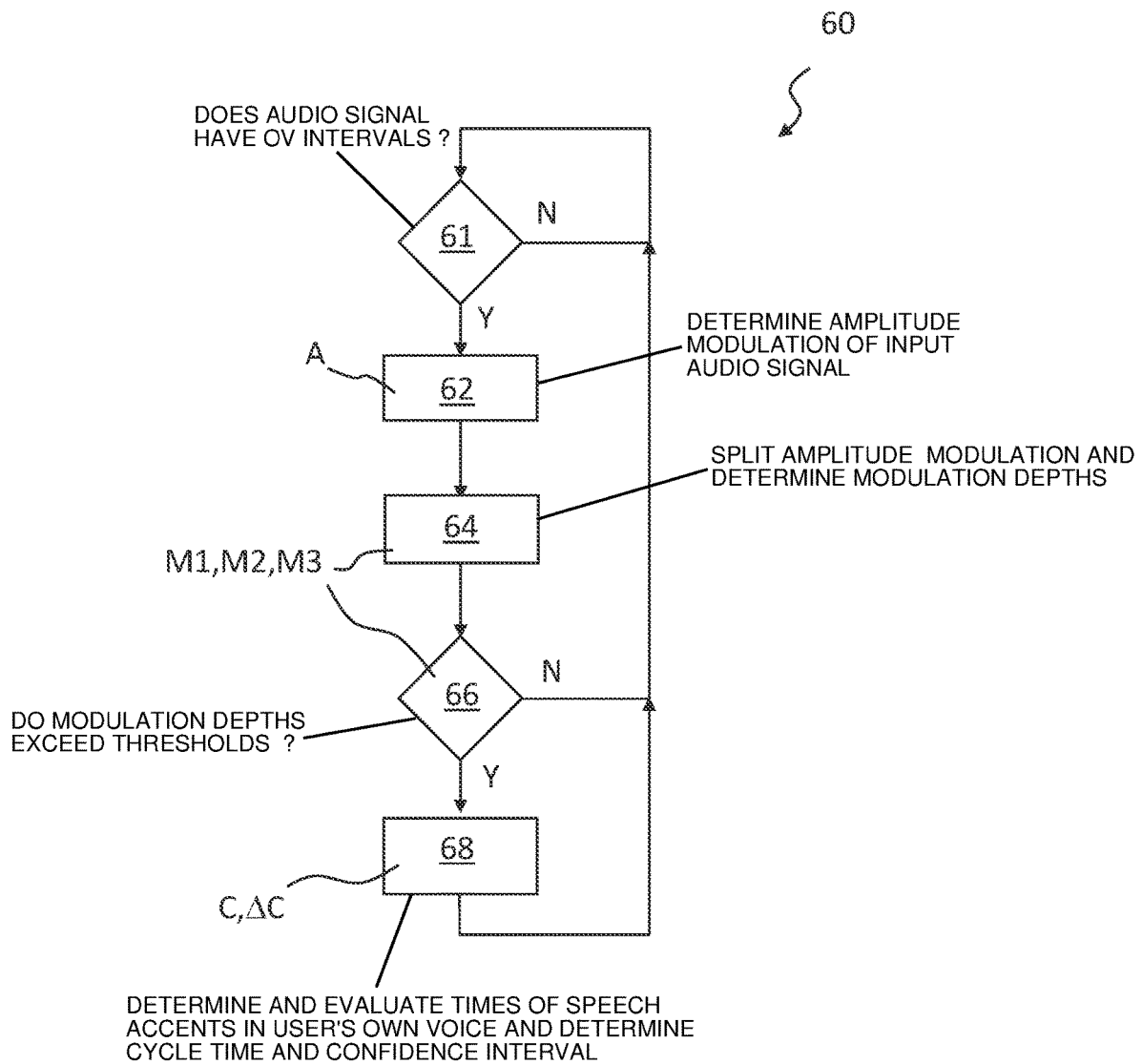
FIG. 6 is a flow chart of an alternative embodiment of the own-voice analysis procedure for determining the SRP of the user.

FIG. 6 shows an alternative OV analysis procedure 60 for deriving the variables characterizing the SRP of the user, i.e., the cycle time C and the confidence interval ΔC.

In a OV recognition step 61 of this procedure, analogous to step 51 of the procedure of FIG. 5, the voice recognition unit 18 analyzes the input audio signal I for OV intervals, i.e., it checks whether the OVD module 22 returns a positive result (indicative of the detection of the own voice of the user in the input audio signal I). If so (Y), the voice recognition unit 18 triggers the voice analysis unit 28 to execute step 62. Otherwise (N), step 61 is repeated.

In step 62, the voice analysis unit 28 determines an amplitude modulation A of input audio signal I (i.e., the time-dependent envelope of the input audio signal I). Moreover, the voice analysis unit 64 splits the amplitude modulation A into three modulation frequency bands (frequency bands of the modulation frequency), i.e.:

a first modulation frequency band including modulation frequencies in a range of 12-40 Hz that corresponds to the typical rate of phonemes in speech,
a second modulation frequency band including modulation frequencies in a range of 2.5-12 Hz that corresponds to the typical rate of syllables in speech, and a
third modulation frequency band including modulation frequencies in a range of 0.9-2.5 Hz that corresponds to the typical rate of speech accents (i.e., stress) in speech.

For each of the three modulation frequency bands, in a step 64, the voice analysis unit 28 determines a respective modulation depth M1, M2 and M3, respectively, by evaluating, within a time window and for the respective modulation frequency band, the maximum sound amplitude and the minimum sound amplitude according to eq. 1. E.g., the time window is set to a value of 84 msec for the first modulation frequency band, to a value of 400 msec for the second modulation frequency band, and to a value of 1100 msec for the third modulation frequency band.

In a step 66, the modulation depths M1, M2 and M3 are compared with corresponding thresholds to recognize speech accents. If the modulation depths M1, M2 and M3 of all modulation frequency bands exceed the respective threshold at the same time (Y), then the voice analysis unit 28 recognizes a speech accent and proceeds to step 68. Otherwise (N), i.e., if no speech accent is recognized, the voice analysis unit 28 triggers the voice recognition unit 18 to execute step 61 again.

In step 68, analogous to step 58 of FIG. 5, the voice analysis unit 28 determines and statistically evaluates the times at which speech accents are recognized in the own voice of the user. In particular, the cycle time C and the confidence interval ΔC are determined as a representation of the SRP of the user, as described before. The cycle time C and the confidence interval ΔC are stored in a memory of the hearing aid 4 for later use during the normal operation of the hearing aid 4.

The procedure 60 is terminated when a sufficiently high number of speech accents (e.g., 1000 speech accents) of the user's own speech have been recognized and evaluated.

In more refined and more precise embodiments of the procedures 50 and 60 according to FIG. 5 or 6, respectively, a more complex SRP of the user including a plurality of time intervals between consecutive speech accents, is derived from the audio input signal I during OV intervals. To this end, for instance, the time intervals between the speech accents recognized in one of steps 56 or 66, respectively, are split in groups of N consecutive speech accents, where N is an integer, the value of which is varied (N=2,3,4, ...) in order to find the best-matching pattern. E.g., the time intervals of the recognized speech accents are split into groups of 2 consecutive speech accents, groups of 3 consecutive speech accents, groups of 4 consecutive speech accents, etc. For each value of N, the groups are compared with each other. The groups that are most similar to each other, are selected to derive the SRP, e.g., by averaging over corresponding times or time intervals of the selected groups. If, for example, this analysis reveals that groups of three consecutive speech accents (N=3) are more similar to each other than groups of two consecutive speech accents (N=2) and groups of four consecutive speech accents (N=4), then the groups of 3 consecutive speech accents are selected for deriving the SRP. In this case, the SRP of the user may be derived by averaging over the respective first time intervals in the selected groups, by averaging over the respective second time intervals in the selected groups and by averaging over the respective third time intervals in the selected groups. In this case, the SRP is represented by an average first time interval between a first speech accent and a second speech accent of the SRP, an average second time interval between a second speech accent and a third speech accent of the SRP, and an average third time interval following the third speech accent of the SRP.

Within the scope of the invention, other statical algorithms or methods of pattern recognition can be used for deriving the SRP of the user. For example, artificial intelligence such like an artificial neural network can be used.

In a further embodiment, the input audio signal I (in particular the input audio signal I captured during OV intervals) is split into a plurality of (sound) frequency bands before being fed to the voice analysis unit 28. In this case, preferably, a low sound frequency range of the input audio signal I (including a lower subset of the sound frequency bands) is analyzed in the OV analysis procedure 50 or 60 selectively. In other words, one or more high sound frequency bands are excluded from (i.e., not analyzed in) the OV analysis procedure 50 or 60.

Figure 7:
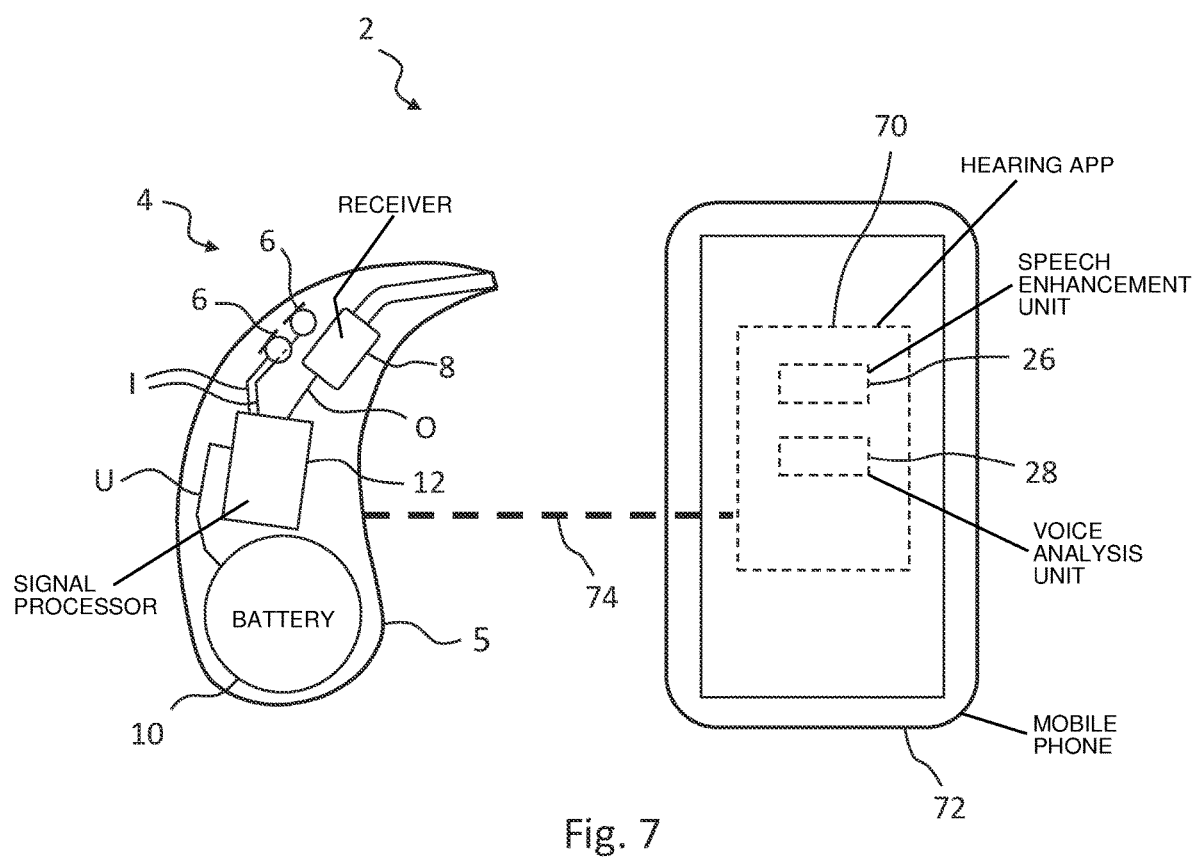
FIG. 7 is a diagrammatic representation of a hearing system including a hearing aid according to FIG. 1 and a software application for controlling and programming the hearing aid, the software application being installed on a mobile phone.

FIG. 7 shows a further embodiment of the hearing system 2 in which the latter includes the hearing aid 4 as described before and a software application (subsequently denoted "hearing app" 70), that is installed on a mobile phone 72 of the user. In this case, the mobile phone 72 is not a part of the system 2. Instead, it is only used by the hearing system 2 as an external resource providing computing power and memory.

The hearing aid 4 and the hearing app 70 exchange data through a wireless link 74, e.g., based on the Bluetooth standard. To this end, the hearing app 70 accesses a wireless transceiver (not shown) of the mobile phone 72, in particular a Bluetooth transceiver, to send data to the hearing aid 4 and to receive data from the hearing aid 4.

In the embodiment according to FIG. 7, some of the elements or functionality of the before-mentioned hearing system 2 are implemented in the hearing app 70 (instead of the hearing aid 2). E.g., a least one functional part of the speech enhancement unit 26 being configured to perform the step 38 is implemented in the hearing app 70. Additionally or alternatively, the voice analysis unit 28 may be implemented in the hearing app 72.

It will be appreciated by persons skilled in the art that numerous variations and/or modifications may be made to the invention as shown in the specific examples without departing from the spirit and scope of the invention as broadly described in the claims. The present examples are, therefore, to be considered in all aspects as illustrative and not restrictive.

The following is a summary list of reference numerals and the corresponding structure used in the above description of the invention.

LIST OF REFERENCE NUMERALS 2 (hearing) system
4 hearing aid
5 housing
6 microphones
8 receiver
10 battery
12 signal processor
14 sound channel
16 tip
18 voice recognition unit
20 voice activity detection module (VAD module)
22 own-voice detection module (OVD module)
24 derivation unit
26 speech enhancement unit
28 voice analysis unit
30 method
31 (speech recognition) step
32 step
34 (derivation) step
36 (speech enhancement) procedure
38 step
40 step
42 step
44 step
46 (artificial) speech accent
50 own-voice analysis procedure (OV analysis procedure)
51 (OV recognition) step
52 step
54 (derivation) step
56 step
58 step
60 own voice analysis procedure (OV analysis procedure)
61 (OV recognition) step
62 step
64 step
66 step
68 step
70 hearing app
72 mobile phone
74 wireless link ΔC confidence interval
t time
t1 time
t2 time
t3 time
t4 time
t5 time
t6 time
t7 time
A amplitude modulation
C cycle time
I input audio signal
D1 (first) derivative
D2 (second) derivative
G gain
M1 modulation depth
M1 modulation depth
M1 modulation depth
O output audio signal
P pitch
TE enhancement interval
U (electric) supply voltage
V variable

The invention claimed is:

1. A method for operating a hearing instrument, the method comprising:
capturing a sound signal from an environment of the hearing instrument;
processing the captured sound signal by:
carrying out a speech recognition step, for analyzing the captured sound signal to recognize speech intervals, in which the captured sound signal contains speech, and
carrying out a speech enhancement procedure performed during recognized speech intervals, for periodically varying an amplitude of the processed sound signal according to a temporal pattern being consistent with a stress rhythmic pattern of a user of the hearing instrument; and
outputting the processed sound signal to the user.

2. The method according to claim 1, which further comprises carrying out an own-voice analysis procedure for determining the stress rhythmic pattern of the user from an own-voice reference signal containing speech of the user.

3. The method according to claim 2, which further comprises carrying out the own-voice analysis procedure by:
determining a modulation depth of an amplitude modulation of the own-voice reference signal in a predefined modulation frequency range;
recognizing speech accents in the own-voice reference signal by analyzing the modulation depth, in which a speech accent is recognized when the modulation depth fulfils a predefined criterion or exceeds a predefined threshold;
determining times of recognized speech accents in at least one of the own-voice reference signal or time intervals between recognized speech accents of the own-voice reference signal; and
deriving the stress rhythmic pattern of the user from at least one of the determined times or time intervals.

4. The method according to claim 3, which further comprises carrying out the step of recognizing speech accents in the own-voice reference signal by:
determining the modulation depth of the amplitude modulation of the own-voice reference signal for each one of a first modulation frequency range of 12-40 Hz, a second modulation frequency range of 2.5-12 Hz and a third modulation frequency range of 0.9-2.5 Hz; and
recognizing a speech accent of the own-voice reference signal when the determined modulation depth exceeds a respective predefined threshold for each one of the three modulation frequency ranges.

5. The method according to claim 2, which further comprises deriving a time average of the time intervals between speech accents of the own-voice reference signal as a representation of the stress rhythmic pattern of the user.

6. The method according to claim 5, which further comprises carrying out the own-voice analysis procedure by:
extracting a low sound frequency range of the own-voice reference signal; and
determining the stress rhythmic pattern of the user from the low sound frequency range only.

7. The method according to claim 1, which further comprises carrying out a derivation step performed during recognized speech intervals, for determining at least one time derivative of at least one of an amplitude or a pitch of the captured sound signal, the speech enhancement procedure including temporarily increasing the amplitude of the processed sound signal, when the at least one derivative fulfils a predefined criterion, or exceeds a predefined threshold, and when a time at which the predefined criterion is fulfilled, is compatible with the stress rhythmic pattern of the user.

8. The method according to claim 1, which further comprises carrying out the speech enhancement procedure by superimposing an artificial speech accent on the captured audio signal by temporarily increasing the amplitude of the processed audio signal to cause the artificial speech accent to match, in a series of preceding speech accents, the stress rhythmic pattern of the user.

9. The method according to claim 1, which further comprises carrying out the speech enhancement procedure by repeatedly increasing the amplitude of the processed sound signal for a predefined time interval or for a time interval of 5 to 15 msec or for a time interval of 10 msec.

10. The method according to claim 1, which further comprises:
determining a degree of difference of the stress rhythmic pattern of the own-voice reference signal with respect to stress contained in the captured sound signal during voice-intervals; and
performing the speech enhancement procedure only when the degree of difference exceeds a predefined threshold.

11. A hearing system, comprising:
a hearing instrument, said hearing instrument including:
an input transducer configured to capture a sound signal from an environment of said hearing instrument;
a signal processor configured to process the captured sound signal, said signal processor including:
a voice recognition unit configured to analyze the captured sound signal to recognize speech intervals, the captured sound signal containing speech, and
a speech enhancement unit configured to periodically vary, in a speech enhancement procedure performed during recognized speech intervals, an amplitude of the processed sound signal according to a temporal pattern consistent with a stress rhythmic pattern of a user of the hearing instrument; and
an output transducer configured to emit the processed sound signal to the user.

12. The hearing system according to claim 11, which further comprises a voice analysis unit configured to determine the stress rhythmic pattern of the user from an own-voice reference signal containing speech of the user.

13. The hearing system according to claim 12, wherein said voice analysis unit is configured:
- to determine a modulation depth of an amplitude modulation of the own-voice reference signal in at least one predefined modulation frequency range;
- to recognize speech accents from the own-voice reference signal by analyzing the modulation depth, wherein a speech accent is recognized when the modulation depth fulfils a predefine criterion, or exceeds a predefined threshold;
- to determine times of recognized speech accents of at least one of the own-voice reference signal or time intervals between recognized speech accents of the own-voice reference signal; and
- to derive the stress rhythmic pattern of the user from at least one of the determined times or time intervals.

14. The hearing system according to claim 13, wherein said voice analysis unit is configured:
- to determine the modulation depth of the amplitude modulation of the own-voice reference signal for a first modulation frequency range of 12-40 Hz, for a second modulation frequency range of 2.5-12 Hz and for a third modulation frequency range of 0.9-2.5 Hz; and
- to recognize a speech accent of the own-voice reference signal if the determined modulation depth exceeds a respective predefined threshold for each one of the three modulation frequency ranges.

15. The hearing system according to claim 12, wherein said voice analysis unit is configured to derive a time average of time intervals between speech accents of the own-voice reference signal as a representation of the stress rhythmic pattern.

16. The hearing system according to claim 12, wherein:
the hearing system is configured to extract a low sound frequency range of the own-voice reference signal; and
said voice analysis unit is configured to determine speech accents of the own-voice reference signal from said low sound frequency range of the own-voice reference signal only.

17. The hearing system according to claim 11, which further comprises:
- a derivation unit configured to determine, during recognized speech intervals, at least one time derivative of at least one of an amplitude or a pitch of the captured sound signal;
- said speech enhancement unit configured to temporarily increase the amplitude of the processed sound signal, when the at least one derivative fulfils a predefined criterion, or exceeds a predefined threshold, and when a time at which the predefined criterion is fulfilled, is compatible with the stress rhythmic pattern of the user.

18. The hearing system according to claim 11, wherein said speech enhancement unit is configured to superimpose an artificial speech accent on the captured audio signal by temporarily increasing the amplitude of the processed audio signal to cause the artificial speech accent to match, in a series of preceding speech accents, the stress rhythmic pattern of the user.

19. The hearing system according to claim 11, wherein said speech enhancement unit is configured to repeatedly increase the amplitude of the processed sound signal for a predefined time interval, or a time interval of 5 to 15 msec, or a time interval of 10 msec.

20. The hearing system according to claim 11, wherein said speech enhancement unit is configured:
- to determine, during speech intervals, a degree of difference of the stress rhythmic pattern of the user with respect to stress contained in the captured sound signal; and
- to perform the speech enhancement procedure only when the degree of difference exceeds a predefined threshold.

\* \* \* \* \*